US009674292B2

(12) United States Patent
Fichtenholtz et al.

(10) Patent No.: US 9,674,292 B2
(45) Date of Patent: Jun. 6, 2017

(54) SERVICE BUS WORKFLOW TEMPLATES

(71) Applicant: Oracle International Corporation, Redwood Shores, CA (US)

(72) Inventors: Greg M. Fichtenholtz, Sunnyvale, CA (US); Pradeep Bollineni, Sunnyvale, CA (US); Jia Yu, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/098,645

(22) Filed: Apr. 14, 2016

(65) Prior Publication Data

US 2016/0248868 A1 Aug. 25, 2016

Related U.S. Application Data

(63) Continuation of application No. 13/748,403, filed on Jan. 23, 2013, now Pat. No. 9,357,018.

(51) Int. Cl.
*H04L 29/08* (2006.01)
*G06F 3/0484* (2013.01)

(52) U.S. Cl.
CPC ............ *H04L 67/28* (2013.01); *G06F 3/0484* (2013.01); *H04L 67/10* (2013.01); *H04L 67/16* (2013.01); *H04L 67/288* (2013.01)

(58) Field of Classification Search
CPC . H04L 41/00; H04L 29/08072; H04L 41/021; G06F 17/289; G06Q 10/1033
See application file for complete search history.

(56) References Cited

U.S. PATENT DOCUMENTS

| 8,219,598 | B1* | 7/2012 | Appleton ............ G06F 21/6263 707/705 |
| 9,357,018 | B2 | 5/2016 | Fichtenholtz et al. |
| 2002/0152254 | A1* | 10/2002 | Teng ........................ G06F 21/41 718/100 |
| 2007/0106633 | A1* | 5/2007 | Reiner .................. G06F 19/321 |

(Continued)

OTHER PUBLICATIONS

U.S. Appl. No. 13/748,403, "Non Final Office Action", Nov. 21, 2014, 12 pages.

(Continued)

*Primary Examiner* — Nicholas Taylor
*Assistant Examiner* — Afroza Sultana
(74) *Attorney, Agent, or Firm* — Kilpatrick Townsend & Stockton LLP

(57) ABSTRACT

In some examples, a service bus may include one or more computing devices configured to translate requests from one or more client applications to one or more proxy services. According to at least one example, a system may create a resource object based at least in part on a template. The template may be associated with configuration information that may identify at least one parameter associated with a third-party application. In some examples, the third-party application may be a web service or a client application. Additionally, the system may generate a message flow based at least in part on the resource object. The system may also process a request, from the third-party application, based at least in part on the message flow. Further, the system may provide a graphical user interface (GUI) associated with the template, the GUI configured to enable input of the configuration information.

19 Claims, 14 Drawing Sheets

(56) References Cited

U.S. PATENT DOCUMENTS

| | | |
|---|---|---|
| 2007/0156878 A1 | 7/2007 | Martin et al. |
| 2007/0236708 A1 | 10/2007 | Jahn et al. |
| 2010/0241990 A1 | 9/2010 | Gabriel et al. |
| 2014/0157113 A1* | 6/2014 | Krishna ................ G06F 17/289 715/249 |
| 2014/0207927 A1 | 7/2014 | Fichtenholtz et al. |

OTHER PUBLICATIONS

U.S. Appl. No. 13/748,403, "Final Office Action", May 22, 2015, 24 pages.
U.S. Appl. No. 13/748,403, "Non-Final Office Action", Nov. 6, 2015, 24 pages.
U.S. Appl. No. 13/748,403, "Notice of Allowance", Mar. 25, 2016, 9 pages.
Gordon, et al. *Oracle® Fusion Middleware: Fusion Developer's Guide for Oracle Application Development Framework*, 11g Release 1 (11.1.1.6.0). Oracle, 2011, 1686 pages.
Creating Complex Taskflows. Datasheet [online]. Oracle, 2011 [retrieved on Feb. 20, 2013]. Retrieved from the Internet: <URL: http://docs.oracle.com/cd/E23943_01/web.1111/b31974/taskflows_complex.htm#BACEIGHA>.

* cited by examiner

SERVICE BUS WORKFLOW TEMPLATES

CROSS-REFERENCES TO RELATED APPLICATIONS

This application is a continuation of, and claims benefit and priority to application Ser. No. 13/748,403, filed Jan. 23, 2013, entitled "SERVICE BUS WORKFLOW TEMPLATES," the entire contents of which is incorporated herein by reference.

BACKGROUND

Client applications often desire to interact with third-party proxy services. For example, a client application may wish to make requests to a web service. However, the client application and the web service may often be configured such that they cannot directly communicate with one another. For example, the client application may utilize a first protocol, such as the java message service (JMS), for sending requests, while the web service may operate under a different protocol, such as the hypertext transfer protocol (HTTP). Additionally, service buses or other types of mediators may be configured to appropriately translate such requests so that the two entities may communicate. However, configuring multiple similar translations based on one or more common guidelines within a single service bus may be time consuming and error prone.

BRIEF SUMMARY

Techniques for providing workflow templates within a service bus are described. As used herein, a "message flow" (also referred to as a "workflow") may include any type of flow that may be generated or otherwise managed by a workflow engine or other software module for processing instructions according to a flow. In some examples, the service bus may include one or more computing devices (e.g., within a distributed computing system) configured to translate requests from one or more client applications to one or more proxy services. According to at least one example, a computing system may create a template-based workflow based at least in part on a template. The template may be associated with configuration information that may identify at least one parameter associated with a third-party application. In some examples, the third-party application may be a web service or a client application. Additionally, the computing system may generate a message flow based at least in part on the template-based workflow. The computing system may also process a request, from the third-party application, based at least in part on the message flow. Further, the computing system may provide a graphical user interface (GUI) associated with the template, the GUI configured to enable input of the configuration information.

In some examples, the template-based workflow may include configurable actions and/or locked actions. The message flow may also be configured to operate as part of a service bus (e.g., a mediation engine). The mediation engine may be configured to mediate between the third-party applications and one or more services. The one or more services may be web services. Additionally, in some examples, the computing system may receive updated configuration information via the template. The system may update the template-based workflow based at least in part on the updated configuration information. Further, the system may automatically update the message flow based at least in part on the updated template-based workflow.

According to at least one example, a computer-readable memory may store instructions that, when executed by one or more processors, cause the one or more processors to generate a template-based workflow based at least in part on a workflow template. Additionally, the instructions may also cause the one or more processors to generate a plurality of workflows. The instructions may also cause the one or more processors to receive, from a remote application, a request to access a proxy service. The instructions may further cause the one or more processors to process the request from the remote application based at least in part on the workflows. At least one of the plurality of workflows may include at least the template-based workflow.

In some examples, the workflow template may include at least configuration information associated with the remote application. Additionally, in some examples, at least one of the plurality of workflows may be configured to inherit changes made to the template-based workflow. The change may be made to the template-based workflow based at least in part on the remote application updating the workflow template. In some examples, the template-based workflow may be configured to include at least one other template-based workflow that may be generated based at least in part on a second workflow template. The template-based workflow may also include branch nodes that may provide one or more additional workflow templates. In some examples, the proxy services may be configured to at least translate access requests into requests configured for transmission to the proxy service. Such requests may be received over a network connection.

According to at least one example, a computer-implemented method may include providing a user interface configured to enable a client application to configure a workflow template. The workflow template may be configured to include at least configuration information associated with the client application. The method may also include generating a template-based workflow based at least in part on the workflow template. A plurality of workflows may also be generated, where each workflow includes the template-based workflow. The method may also include receiving a request to access a proxy service. The request may be received from a client application. The method may further include processing the request from the client application based at least in part on the plurality of workflows.

In some examples, the user interface may include at least a GUI component configured to enable entrance of the configuration information associated with the client application. The workflows may be configured to perform actions based at least in part on the template-based workflow. In some examples, the GUI may be further configured to enable the client application to update the workflow template with additional configuration information. The workflows may then be modified based at least in part on the change to the template-based workflow, the change based at least in part on the updated workflow template. Further, in some examples, the workflows may be modified in real time with reference to the updated workflow template.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
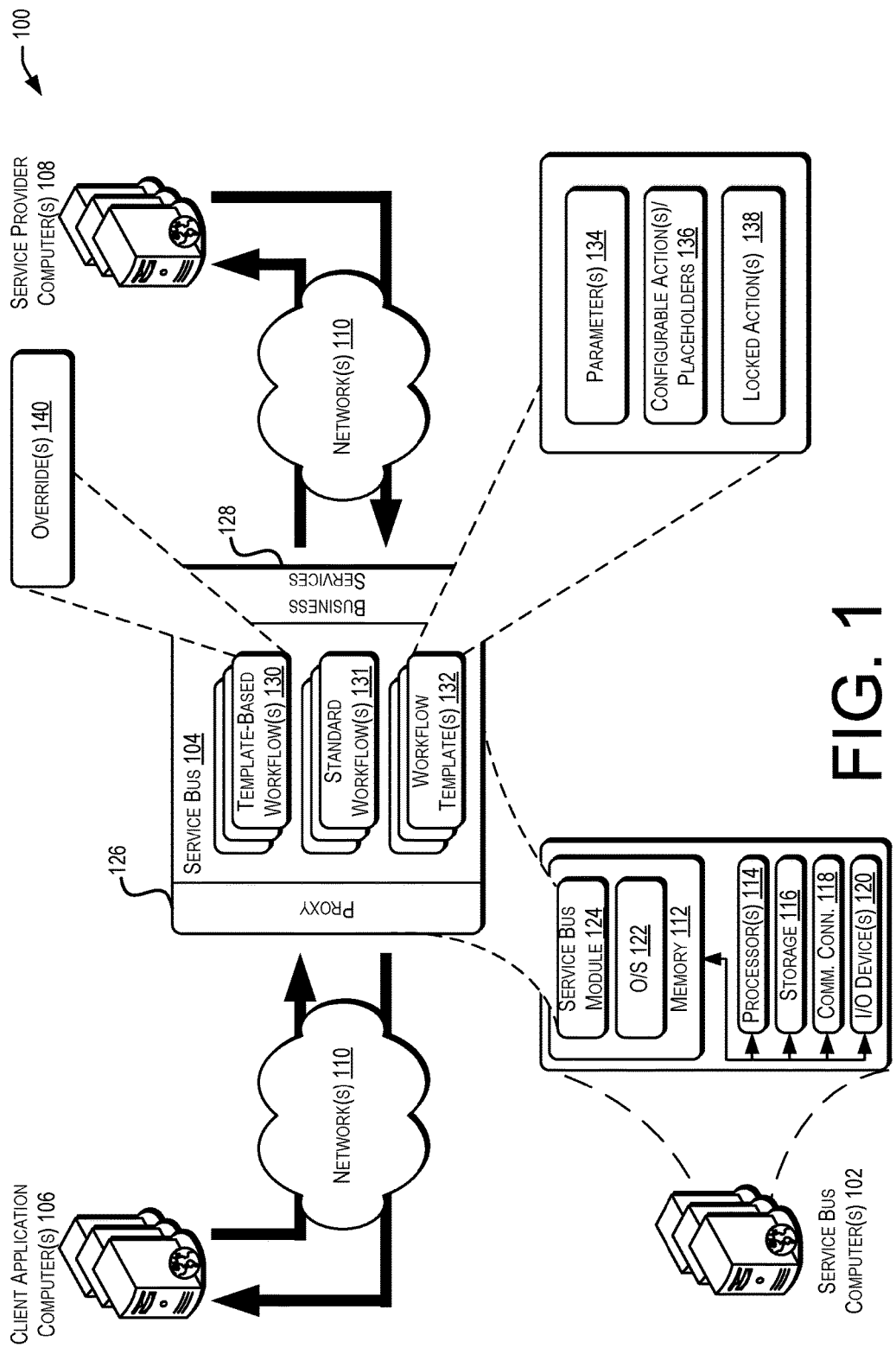
FIG. 1 is a simplified block diagram illustrating an example architecture for providing workflow templates for use within one or more service buses that includes one or more service bus computers, one or more client application computers, and one or more service provider computers connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing workflow templates for use within one or more service busses (also referred to as translators, mediation engines, or the like). In some examples, a service bus may implement one or more workflows (also called pipelines and/or message flows) for enabling interaction between software applications. In some aspects, the service bus may be configured to provide asynchronous message oriented communication and/or interaction between such applications which may not communicate using the same languages. For example, a first client application may wish to request a resource from a proxy service (e.g., a web service). However, if the two systems (i.e., the client application and the web service) utilize different protocols and/or languages, the service bus may facilitate the resource request on behalf of the client application, and then provide the response from the web service back to the client application. Essentially, the service bus may act as a translator or mediator between the two applications.

In some aspects, the service bus may provide commonly utilized commodity services and may be configured to adopt, translate, and/or route client requests to appropriate proxy services. For example, the service bus may monitor and/or control routing of message exchanges between services. The service bus may also resolve contention between communicating service components and/or control deployment and/or versioning of services. Further, in some examples, the service bus may marshal the user of redundant services and/or may cater to commonly needed commodity services such as, but not limited to, event handling, event choreography, data transformation, data mapping, message and/or event queuing and/or sequencing, security and/or exception handling, protocol conversion (i.e., translating), and/or the enforcement of proper quality of communications and/or services.

Additionally, in some examples, the service bus may be configured to implement one or more workflow templates. Workflow templates may be provided via a GUI and/or may provide the ability to provision new services on the service bus without much repetition. For example, a workflow template may enable a developer to provision services that conform to one or more best practices for a variety of integration patterns. Additionally, a workflow template may allow a developer to build out a message flow within the service bus that can be re-used as a "prototype" for provisioning new services quickly. For example, a template designer may define a general shape or pattern of a message flow, and may be able to generate many workflows from the workflow template. The workflows, in some aspects, may each follow the same pattern as the workflow template and/or may allow for pieces of custom logic to be inserted in particular places of the workflow.

In some aspects, the workflow template may define a notion of a resource (also referred to as a workflow resource or a "template-based workflow") that may have a full life cycle like other service bus artifacts. Additionally, message flows may be created and/or provisioned based at least in part on this workflow template. In some examples, a template designer may designate particular portions of the workflow template and/or message flow where business logic may reside. In other words, the workflow template may include configurable actions and lockable actions. In this way, other than the configurable actions, the message flows may follow flows defined by the workflow template.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many examples.

FIG. 1 depicts a simplified example system or architecture 100 in which techniques for managing workflow templates may be implemented. In architecture 100, one or more service bus computers 102 may provide a service bus 104 for implementing the workflow templates described herein. In some examples, the service bus 104 and/or the service bus computers 102 may be accessible to one or more client application computers 106 and/or one or more service provider computers 108 via one or more networks 110.

By way of example only, the service bus computers 102 may be configured to execute the service bus 104 as well as other programming modules or the like. Additionally, in some examples, the client application computers 106 may be configured to execute one or more client applications. Client applications may include, but are not limited to, web services, client-side software applications, web browsers, email clients, etc. Further, in some aspects, the service provider computers 108 may be configured to execute one or more services (e.g., server-side applications, web services, or the like).

In some examples, the networks 110 may include any one or a combination of multiple different types of networks, such as cable networks, the Internet, wireless networks, cellular networks, intranet systems, and/or other private and/or public networks. While the illustrated example represents the client application computers 106 and/or the service provider computers 108 accessing the service bus 104 over the networks 110, the described techniques may equally apply in instances where the service bus computers 102 are accessible over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

In some aspects, the service bus computers 102 may be any type of computing devices such as, but not limited to, mobile, desktop, thin-client, and/or cloud computing devices, such as servers. In some examples, the service bus computers 102 may be in communication with the client application computers 106 and/or the service provider computers 108 via the networks 110, or via other network connections. The service bus computers 102 may include one or more servers, perhaps arranged in a cluster, as a server farm, or as individual servers not associated with one another. These servers may be configured to perform or otherwise host features described herein including, but not limited to, the workflow templates. Additionally, in some aspects, the service bus computers 102 may be configured as part of an integrated, distributed computing environment. The service bus computers 102 may operate within a Java EE container, a WebLogic server, or any other environment configured with one or more server applications, enterprise portals, application integration platforms, transaction servers and/or infrastructures, telecommunication platforms, and/or web servers.

In one illustrative configuration, the service bus computers 102 may include at least one memory 112 and one or more processing units (or processor(s)) 114. The processor(s) 114 may be implemented as appropriate in hardware, computer-executable instructions, firmware, or combinations thereof. Computer-executable instruction or firmware implementations of the processor(s) 114 may include computer-executable or machine-executable instructions written in any suitable programming language to perform the various functions described.

The memory 112 may store program instructions that are loadable and executable on the processor(s) 114, as well as data generated during the execution of these programs. Depending on the configuration and type of the service bus computers 102, the memory 112 may be volatile (such as random access memory (RAM)) and/or non-volatile (such as read-only memory (ROM), flash memory, etc.). The service bus computers 102 or servers may also include additional storage 116, which may include removable storage and/or non-removable storage. The additional storage 116 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 112 may include multiple different types of memory, such as static random access memory (SRAM), dynamic random access memory (DRAM), or ROM.

The memory 112, the additional storage 116, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 112 and the additional storage 116 are all examples of computer storage media.

The service bus computers 102 may also contain communications connection(s) 118 that allow the service bus computers 102 to communicate with a stored database, another computing device or server, user terminals, and/or other devices on the networks 114. The service bus computers 102 may also include input/output (I/O) device(s) 120, such as a keyboard, a mouse, a pen, a voice input device, a touch input device, a display, speakers, a printer, etc.

Turning to the contents of the memory 112 in more detail, the memory 112 may include an operating system 122 and one or more application programs or services for implementing the features disclosed herein including at least a service bus module 124. In some examples, the service bus module 124 may be configured to provide a service bus 104, receive requests for services from client application computers 106, transmit requests to service provider computers 108, and provide responses to requests back to the client application computers 106. In other words, the service bus module 124 may be utilized as a mediator, translator, or type of proxy service proxy between the client application computers 106 and the service provider computers 108.

By way of example only, the service bus 104 may be configured with a proxy component 126 and/or a business services component 128. The proxy component 126 may be configured to receive requests from the client application computers 106. Such requests may include requests for data, services, or other information associated with the one or more service provider computers 108. Additionally, such requests may be formatted in accordance with one or more particular protocols that are used by client applications of the client application computers 106 sending the requests. As such, the proxy may act a portal or application programming interface (API) for interacting with the service bus 104 from the client application side. In some examples, the business services component 128 may be configured to provide requests to the service provider computers 108 in a language or based at least in part on a protocol familiar to or otherwise understood by the service provider computers 108. For example, each service provider computer 126 may execute one or more services that operate under different protocols or different programming languages. As such, via the business services component 128, the service bus 104 may effectively communicate with the service provider computers 108 independent of the protocols, formatting, or languages utilized by the client applications. As such, and similar to the proxy component 126, the business services component 128 may act as a portal to the service provider computers 108. In some examples, the proxy component 126 may expose APIs to the client application computers 106 and/or the service provider computers 108 may expose APIs to the business services component 128. However, other configurations are possible as well.

In some aspects, the service bus 104 may be configured to store and/or implement one or more template-based workflows 130, one or more standard workflows 131 (also referred to as a "standard workflow," a "standard pipeline," or similar phrases), and/or one or more workflow templates 132. A template-based workflow 130 may include, but is not limited to, parameter information, request information, workflow message information, and/or actions to be performed within the workflow. In some instances, a template-based workflow 130 may be considered a pipeline resource, a concrete pipeline resource, and/or a concrete pipeline. In other words, the template-based workflow 130 may implement a workflow or process for implementing a workflow on behalf of a client application. As such, the template-based workflows may be created or otherwise configured by the client application computers 106 for effectively routing, translating, configuring, and/or formatting requests from the client application computers 106 to the service provider computers 108. Additionally, in some examples, the template-based workflows 130 may be instantiated by or otherwise include a link to, among other things, the one or more workflow templates 132 (also referred to as "workflow templates," "template resources," "pipeline templates," or other similar phrases including the term "template," or "templates"). The template 132 may be created, generated, requested, and/or configured by the client application computers 106 (e.g., via a GUI provided by the service bus 104).

In some examples, and as discussed briefly above, a template-based workflow 130 may be instantiated by or otherwise include a link to a template 132 and/or may be formed based at least in part on the template 132 and/or other customizations. In other words, a template-based workflow 130 may be an object oriented abstraction formed by combining a template 132 with any customizations (i.e., a template override 140 or the like). As noted above, a template 132 may be configured with parameters 134 (e.g., provided by the client application computers 106) and/or actions to be performed by the service bus 104. Actions may include both or either configurable actions/placeholders 136 or locked actions 138. In some examples, a configurable action 136 may be a placeholder that otherwise indicates that a developer may configure the action to be performed in the workflow based at least in part upon this template 132. However, a locked action 138 may be configured by an administrator of the client application computers 106 (e.g., a template designer, etc.) such that the action in the template-based workflow 130 may not be configured in the template-based workflow 130 based at least in part upon this template 132. In other words, these locked actions 138 may be predetermined by the administrators to conform to some best practices or guidelines of the client application. As such, the locked actions 138 may be locked in the template to ensure that they are not changed in the template-based workflow 130. Further, template-based workflows 130 that include templates 132 or are formed based at least in part on templates 132 may inherit the actions, parameters, and/or business rules of the template. In this way, changes to the template 132 after the template-based workflows 130 are instantiated may be pushed to or otherwise updated within the template-based workflows 130 (e.g., in real-time). At least in this context, updating the template-based workflows 130 in real-time may be defined by an update instruction being performed substantially immediately after the template 132 is changed, at least before the next operation of the template-based workflow 130 is performed, and/or in direct response to the template 132 being updated. Additionally, in some examples, the template-based workflows 130 may also be configured with and/or by overrides 140 (e.g., a template override designed to alter the configuration of the workflow templates 132 and/or the functionality of the template-based workflows 130). Further, in at least one non-limiting example, the standard workflows 131 may include workflows that are not instantiated using (or linked to) workflow templates 132.

As noted above, users (i.e., client application computers 106) may request a mechanism to rapidly provision new services on the service bus 104 that follow established best practices for a variety of integration patterns. As such, the client application computers 106 may utilize the templates 132 to build out message flows and re-use them as a prototype or template for provisioning new services quickly and with few or no errors. The template designer (i.e., an administrator associated with a client application hosted by a client application computer 106) may define a general shape or pattern of a message flow, and be able to generate many template-based workflows 130 from this template 132 that all follow the same pattern, possibly with a few pieces of custom logic inserted in specifically designated places. In some examples a user (e.g., a template designer or the like) may create and/or manage templates. In some aspects, a user (e.g., an operator or the like) may create and/or customize message flows based on the template.

Additional types of computer storage media (which may also be non-transitory) that may be present in the service bus computers 102 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service bus computers 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
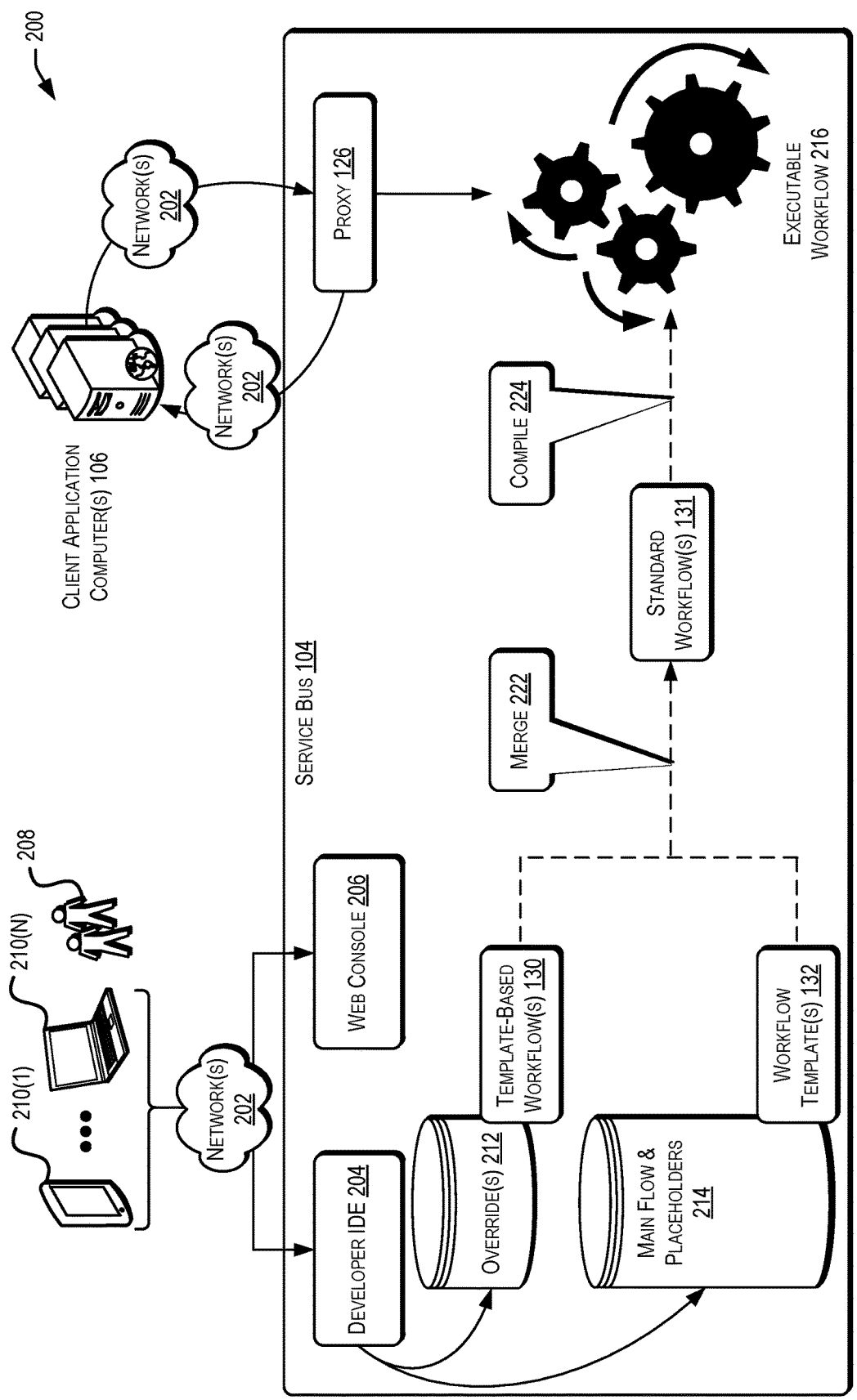
FIG. 2 is a simplified block diagram illustrating at least some features of the workflow templates described herein, according to at least one example.

FIG. 2 depicts a simplified example architecture 200 in which additional techniques for providing workflow templates may be implemented. In architecture 200, the one or more client application computers 106 of FIG. 1 may access the service bus 104 via the proxy 126, as described with reference to FIG. 1, over one or more networks 202. The proxy 126 may in some instances access or instantiate one or more proxy services as defined and/or configured by a user. Additionally, in some examples, the service bus 104 may also be configured to include a developer environment (e.g., an integrated development environment (IDE)) 204 and/or a web console 206 for configuring the service bus 104. As such, one or more developers 208, accessing developer computers 210(1)-(N), may access the service bus 104 via the developer IDE 204 and/or the web console 206. In some examples, the web console 206 may provide a GUI for designing and/or implementing the one or more templates described above with reference to FIG. 1. Additionally, in some examples, the developer IDE 204 may be a software application hosted by or otherwise executed in conjunction with the service bus 104 for accessing, configuring, implementing, and/or updating the templates. Further, in some examples, the developer devices 210 may be one of the client application computers 106 and/or the developers 208 may be associated with the client applications that run on the client application computers 106.

In some examples, the developer IDE 204 and/or the web console 206 may be in communication with one or more data stores. For example, the developer IDE 204 and/or the web console 206 may access an overrides storage device 212 and/or a main flow and placeholders storage device 214. In some examples, the overrides storage device 212 may include actions, nodes, branches, changed overrides, and/or added overrides. In some aspects, an override may be utilized by a developer 208 or other client application computer 106 user to make changes to values of action properties to be performed by the service bus 104. For example, an executable workflow 216 may be generated by the service bus 104 based at least in part on actions, placeholders, and/or parameters provided by the developers 208. However, in some examples, actions and/or parameters associated with a template may override predefined actions and/or parameters. In some cases, however, only unlocked actions may be overridden. Additionally, in some examples, the overrides storage device 212 may store only the overrides, while the main flow information and/or the placeholders may be stored in the main flow and placeholders storage device 214. In some aspects, an action placeholder override may override a placeholder in a template with one or more actions. Further, the main flow and placeholders storage device 214 may include message flow pair nodes, proxy information, and/or placeholders. Placeholders may include positions in a template that indicate user- or developer-definable and/or—customizable actions. For example, if a developer 208 decides to allow a user of the client application computers 106 to customize a workflow by adding actions into the template, a placeholder may be inserted. The user may then add actions and/or other conditions at the placeholder.

In some examples, a node placeholder override may allow a user to configure one or more pipeline pair nodes and/or branch nodes. The node placeholder override may also allow a user to route nodes in a workflow that includes workflow templates. A template operational branch node placeholder override may allow a user to configure an operational branch node in a workflow that includes a workflow template. Additionally, in some examples, a template conditional branch node placeholder override may allow a user to configure a conditional branch node in a workflow that includes a workflow template. A stage placeholder override may allow a user to configure one or more stages. An action placeholder override may allow a user to configure one or more actions. A stage override may allow a user to configure stage-specific properties, such as, but not limited to, a list of user-defined namespaces or the like. Further, an action override may allow a user to override properties in an unlocked action.

In some aspects, a template-based workflow 130 (e.g., as described with reference to FIG. 1) and/or a workflow template (e.g., as described with reference to FIG. 1) may be generated based at least in part on the data stored within the overrides data store 212 and/or the main flow and placeholders data store 214, respectively. For example, override information may be utilized to generate the template-based workflow 130 which may or may not yet include any template information. Additionally, main flow and/or placeholder information may be utilized to generate the workflow template 132 which may include the template information derived from the main flow and placeholder information or otherwise received from the developer IDE 204 (or, in some aspects, via the web console 206). Upon generation of the template-based workflows 130 and/or the workflow templates 132, the service bus 104 may merge 222 the two resources to generate a standard workflow 131 (e.g., as described above with reference to FIG. 1). This standard workflow 131 may be stored in a memory such as, but not limited to, the memory 112 of FIG. 1. Further, in some examples, the service bus 104 may compile 224 the standard workflow 131 (e.g., including the workflow template 132) to generate the executable workflow 216. As such, when the client application computers 106 later access the proxy 126 by sending requests to the service bus 104, the proxy service 126 may access the executable workflow 216, via (or by utilizing) the proxy service 203, for processing such requests.

As with the networks 110 of FIG. 1, the networks 202 may include any one or a combination of multiple different types of networks, such as cable networks, the Internet, wireless networks, cellular networks, intranet systems, and/or other private and/or public networks. While the illustrated example represents the developer devices 210 and/or the client application computers 106 accessing the service bus 104 over the networks 202, the described techniques may equally apply in instances where the developer devices 210 and/or the client application computers 106 interact with the service bus 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

Figure 3:
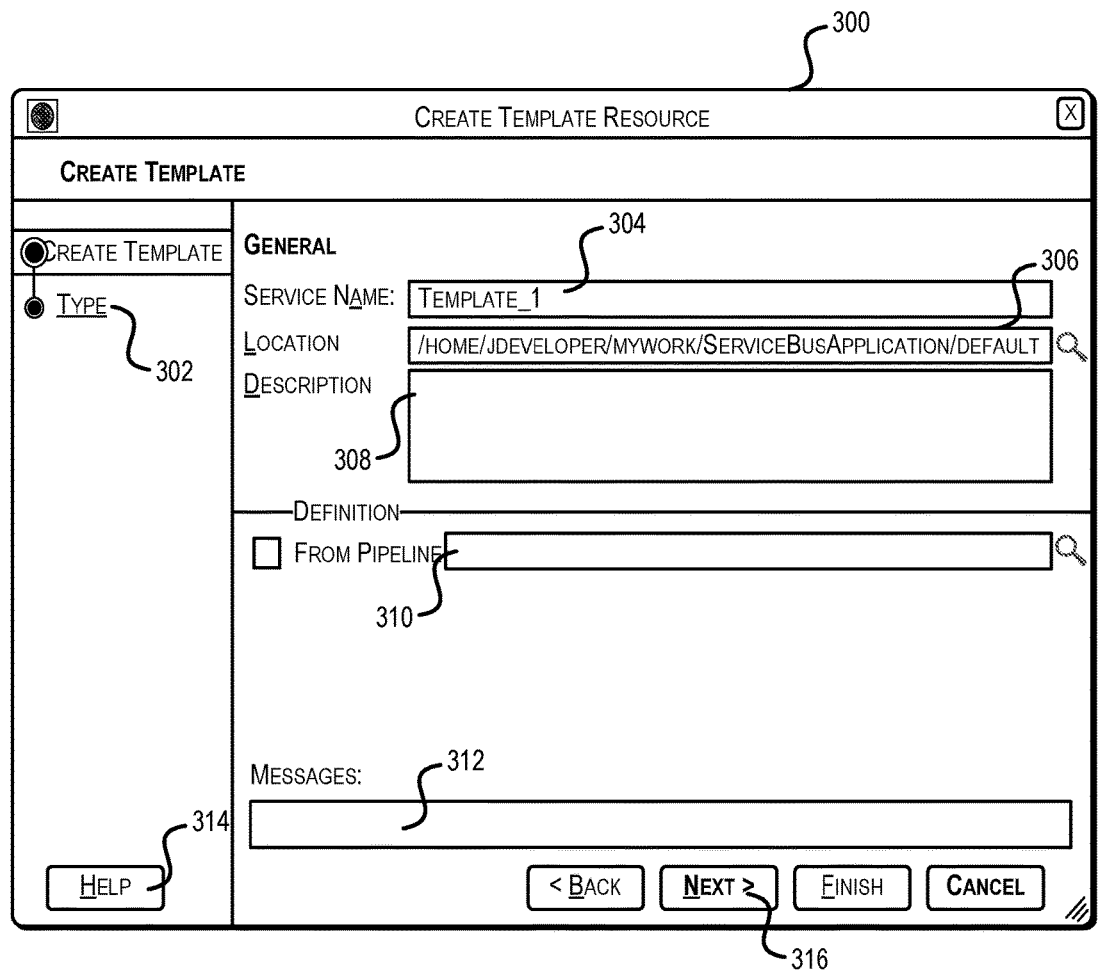
FIG. 3 is a simplified block diagram illustrating at least one user interface for implementing or enabling the workflow templates described herein, according to at least one example.

FIG. 3 depicts a simplified example user interface 300 in which additional techniques for providing workflow templates may be implemented. For example, the example user interface 300 may be configured to enable a user and/or developer to create one or more template resources such as, but not limited to, the workflow template 132 of FIGS. 1 and 2 and/or the template-based workflow 130 of FIGS. 1 and 2. In some examples, the user interface 300 may provide links and/or text fields for selection and/or text input, respectively. For example, a user may select the "type" link 302 for selecting one or more template types from a list or other selectable organization. Additionally, in some examples, a service name 304 may be entered in a text field. The service name may indicate a particular template name for the template being created or it may indicate the proxy service with which the workflow will attempt to communicate. In some examples, the user interface 300 may also include a location text field 306. The location 306 may indicate a physical or logical storage device location for the template resource to be stored or from where the template resource is to be retrieved.

Description text field 308 may allow the user or developer to input a description of the template and/or the workflow being generated. The user may utilize this section to annotate or otherwise comment on the template resource such that it will be more identifiable for later utilization (e.g., with other workflows or the like). In some examples, a from template check box 310 may enable selection of one or more standard of which to base the main flow of the template being created. For example, when selected, the selected standard workflow may serve as a prototype for the new template. Additionally, a message text field 312 may be utilized for providing error messages to users (e.g., "template with the name foo already exists," or the like). When updating a previously generated template resource, in some aspects, the updates may have immediate effect on message handling options of any template-based workflows instantiated from the template resource. A help link 314 may be provided for enabling access to one or more help files and/or knowledge base information associated with the user interface 300 and/or operation of the service bus 104. Further, a next link 316 may be provided for advancing the user and/or developer to the next step in creation of the template resource. However, in some examples, a finish link may be provided instead of the next link 316, when the information provided in the user interface 300 is enough to create the template resource without additional steps.

Figure 4:
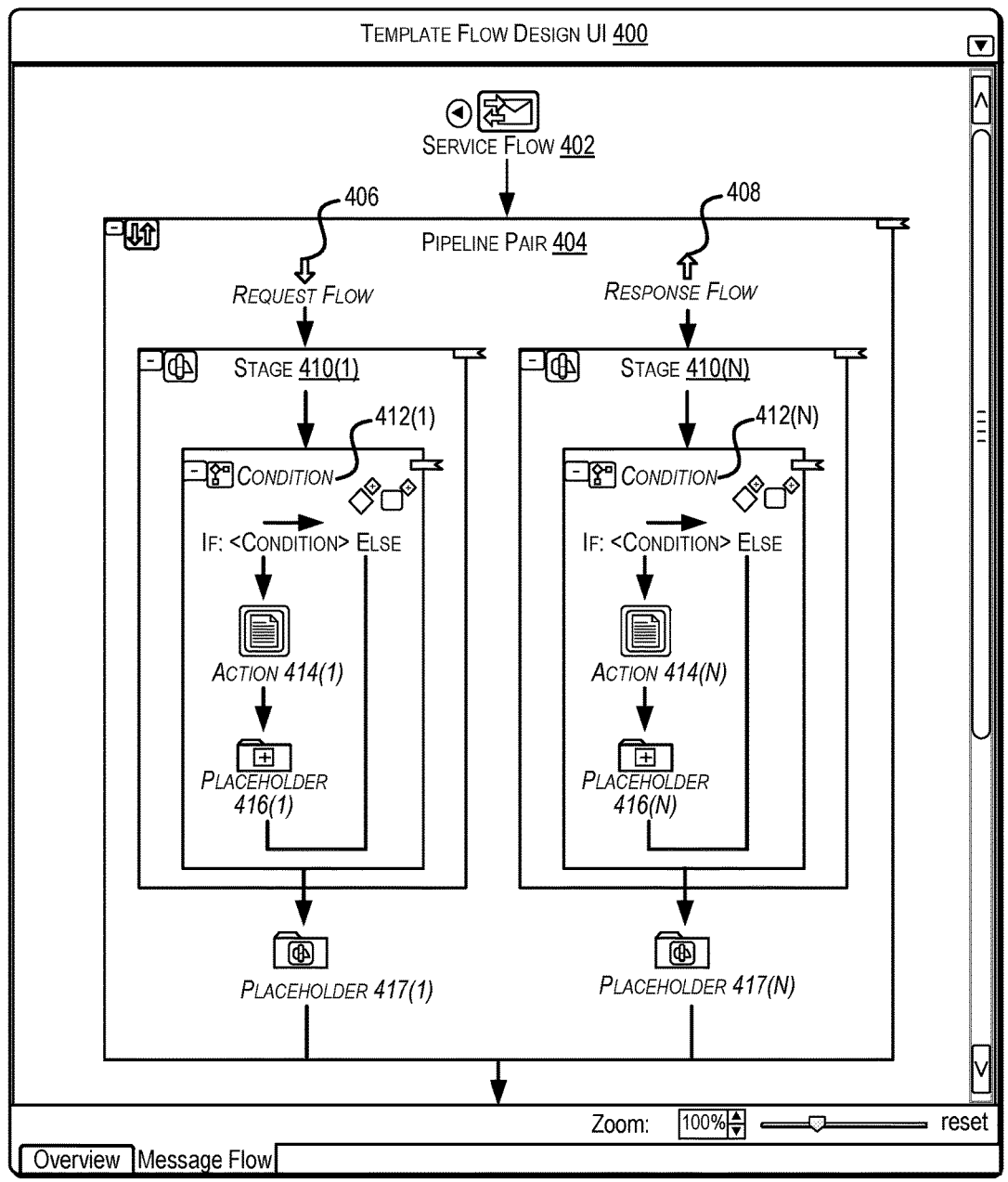
FIG. 4 is a simplified block diagram illustrating at least one additional user interface for implementing or enabling the workflow templates described herein, according to at least one example.

FIG. 4 depicts an additional simplified example user interface 400 in which additional techniques for providing workflow templates may be implemented. For example, the example UI 400 may be configured to provide additional configuration options to users and/or developers. Additionally, the UI 400 may provide a visual representation of the template resource and/or the message flow generated based at least in part on the template resource. In some examples, the UI 400 may be provided to a developer or other administrator for designing template resources. These template resources may then be utilized to instantiate a template-based workflow and/or one or more executable workflows such as, but not limited to, the executable workflow 216 described in FIG. 2.

As shown in FIG. 4, the UI 400 may be described as a template flow design UI (otherwise referred to as a template resource design UI or template message flow design UI). The template flow design UI 400 may include a visual representation of a service flow 402, detailing aspects of a one or more pipeline pairs 404, each of which may contain one or more stages. Additionally, the top level of the service flow 402 may include a branch node and/or a route node in place of, or along with, the pipeline pair node 404 shown. In some aspects, a developer or administrator associated with a client application may be able to physically place, select, or otherwise manipulate the icons of the template flow design UI 400 with use of a mouse or other input device. The pipeline pair 404 may include a request flow 406 and/or a response flow 408. In some examples, the request flow 406 may indicate instructions and/or actions to be performed during the workflow portion associated with requests received from client applications. Additionally, in some examples, the response flow 408 may indicate instructions and/or actions to be performed during the workflow portion of the flow associated with responses sent back to the client applications. The response flow 408 and/or the response sent back to the client applications may be based at least in part on a response received from a proxy service.

In some examples, a branch node may be a conditional branch node or an operational branch node. The branch node may also contain pipeline pair nodes and/or route nodes. In some aspects, a pipeline pair node may have a request pipeline and/or a response pipeline (in some cases as a pair, e.g., request and response). A pipeline may be made up of zero or more stages. Similarly, a stage may be made up of zero or more actions. When present, a route node may be last in the flow 402 and/or may contain actions. A message flow may be defined as a collection of nodes organized in a tree that represent router logic. A branch node may be defined as a node that provides conditional path processing in the flow. A pipeline pair node may be defined as a node that includes a pair of pipelines for general processing. A route node may be defined as a node configured to perform outbound communication with another service. In some non-limiting examples, a route node may only appear at the end of a path in the message flow 402. A pipeline may be defined as a named sequence of stages representing a non-branching one-way processing path, according to some examples. A stage may include a named sequence of actions. Further, an action may include a user-configured processing step (e.g., transformation, routing, etc.).

Additionally, in some examples, request and response paths may be created by pairing request and response pipelines together and organizing them into a single-rooted tree structure. A branching node may allow for conditional execution and routing nodes at the ends of the branches may perform request and/or response dispatching. This tree structure may allow for a clear overview of the router behavior, making both routing actions and branching conditions explicit parts of the overall design, rather than burying them deep inside of a pipeline stage. A message flow may be constructed by chaining together instances of at least three top-level components including, but not limited to, the pipeline pair node, the branching node, and/or the routing node. The pipeline-pair node may tie together a single request and a single response pipeline into one top-level element. A pipeline-pair node may, in some examples, have only one direct descendant in the message flow. During request processing, the request pipeline may be executed when visiting a pipeline-pair node. When reversing the path for response processing, the response pipeline may then be executed.

Additionally, a branching node may allow processing to proceed down one or more (or exactly one, in some examples) of several possible paths. Branching may be driven by a simple lookup table with each branch tagged with a string value (in some cases, utilizing unique string values for each). An expression configured in the branch node may be evaluated against the message context, and its value may be used to determine which branch to follow. If no branch matches the value of the branch expression, then a default branch may be followed. A branching node may have several descendants in the message flow: one for each branch including the default branch. Further, the routing node may be used to perform request/response communication with another service. It may, in some aspects, represent the boundary between request and response processing for the proxy. When the routing node dispatches a request message, request processing may be considered over. When the routing node receives a response message, response processing may begin. The routing node may have support for conditional routing as well as outbound and response transformations. Whether conditions appear inside the routing node or up in the message flow as branching nodes may be configured by the user. As the routing node represents the boundary between request and response processing, it may not have any descendants in the message flow.

In addition to a 'standard' branching node (i.e. a conditional branch or operational branch), a template-based workflow may also have a 'template' branching node (i.e. a template conditional branch and/or a template operational branch). Compared to a standard branching node, which may have an unlimited number of branches and each branch condition (conditional expression or operation name) may have to be fully configured, the template branch node may only have two branches: the main branch and the default branch, which do not have to be fully configured. Both the main branch and the default branch in the template may serve as mini-templates for the branch flow in the instantiated workflow and may contain placeholders and pipeline pair nodes. The main branch may be a mini-template for a specific condition/operation in the yet-to-be-instantiated workflow, and the default branch may be a mini-template for a flow that is not covered via the main branch configuration (similar to a switch/case statement in C++ or java). When the user creates a template-based workflow from this template, they may need to fully specify the number of branches as well as a condition/operation for each of the branches. For example, the main branch of the operational template branch may contain a pipeline pair node, a stage, and a log action. In this case, all configured branches of the workflow instantiated from this template may follow the same flow pattern: a pipeline pair node, a stage, and a log action.

Each of the flows, either the request flow 406 and/or the response flow 408, may include one or more stages 410(1)-(N), "If-Then-Else actions" 412(1)-(N), actions 414(1)-(N), and/or placeholders 416(1)-(N). Each stage 410 may include or otherwise indicate the process flow and/or instructions to be performed at a given portion of the message flow. Conditions 412 may provide the ability to enable conditional processing during the message flow (e.g., utilizing if/then statements or other conditional phrases). Actions 414 may include any action to be performed on the data or other parameters associated with the request or the response. For example, while the action 414(1) of FIG. 4 is shown as a "log" action any action may be inserted here including, but not limited to, assign, delete, insert, java callout, MFL transform, NXSD Translation, rename, replace, validate, alert, report, for each, if then, raise error, reply, resume, skip, publish, and/or route, to name only a few. Additionally, actions may be locked such that they may not be overridden, changed, edited, or otherwise altered by a client of the service bus (e.g., pipeline resources that utilize this template object or the like). As such, when locked, an action 414 may indicate a common policy or rule to be inherited by all template-based workflows that utilize this template. Additionally, when actions 414 are unlocked, default information may be provided in the event that a client does not assign an action 414 or a parameter associated with the action 414.

In some cases, an action placeholder 416 may indicate a location (provided by the administrator or developer) where a client may insert any actions. Additionally, an stage placeholder 417 may indicate a location where a client may insert a stage. In this way, the template may be customizable to a certain degree. That is, once the design of the template resource is completed via the template flow design UI 400, client entities and/or users of the service bus may utilize a second UI to configure the template flow by adding new actions at the placeholders 416, 417 and/or editing/configuring unlocked actions 414. Alternatively, or in addition, the users may add new actions at the placeholders when editing the flow of the pipeline resource that uses the template. Additionally, in some aspects, branching functions may be utilized. Conditional branches (e.g., similar to a switch statement) may be inserted into the service flow 402. For example, a conditional branch may state that if a value equals 1, a certain action should be taken, while if the value equals 2, a different branch should be followed. In some cases, the branch function may be considered a mini template resource, a nested template resource, and/or a template function within a template resource.

Figure 5:
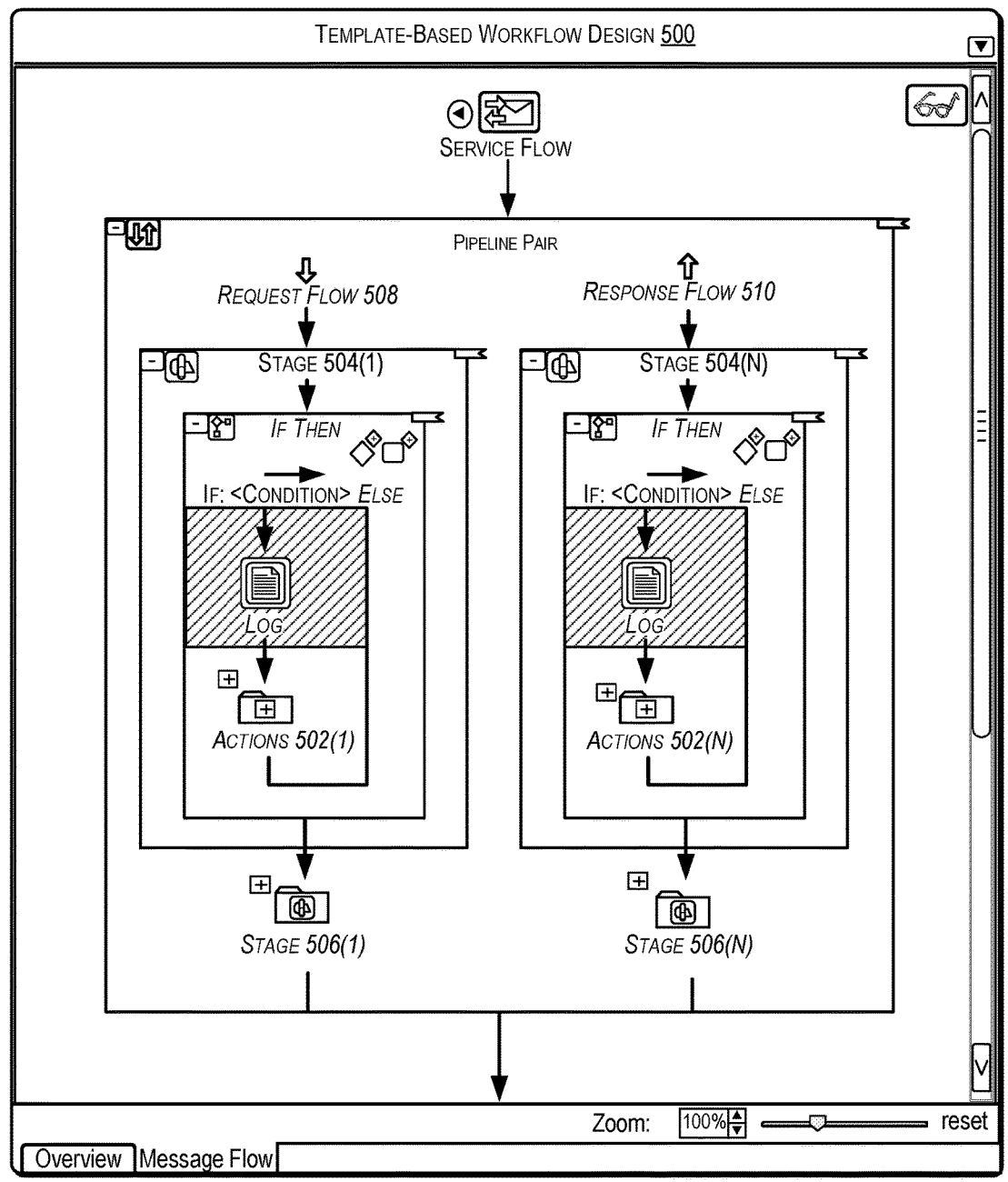
FIG. 5 is a simplified block diagram illustrating at least one user interface for implementing or enabling the template-based workflows associated with the workflow templates described herein, according to at least one example.

FIG. 5 depicts an additional simplified example user interface 500 in which additional techniques for providing workflow templates may be implemented. For example, the example UI 500 may be configured to provide template-based pipeline configuration options to users of the service bus. For example, the UI 400 may have enabled creation of the template resource based at least in part on policies of the client application and/or policies associated with the developer that created the template resource. However, the UI 500 may be utilized by another user or client entity of the client application to implement or otherwise utilize the template resource created via the UI 400. Additionally, in some examples, the standard pipeline design UI 500 may be configured to allow users to instantiate template-based workflows that inherit (e.g., automatically) features, parameters, actions, and/or updates associated with the UI 500.

In some examples, a user may access the UI 500 to configure a template-based pipeline. In other words, the template resource may have been created with particular actions locked and other actions unlocked and, via the UI 500, a user may configure at least the unlocked actions. For example, the log actions shown in FIG. 5 within the shaded areas may have been provided (and/or locked) by a developer utilizing the UI 400. As such, a user using the UI 500 to configure the template-based pipeline for use within a workflow engine may insert one or more actions 502(1)-(N) within each stage 504(1)-(N). However, the log actions, if locked, may not be changed or may at least have particular parameters that cannot be changed. For example, the log action may be locked such that a log action is always executed at this point in the workflow; however, a user may configure what is logged, and/or how much information is logged. Other configurations are possible as well that may provide configuration of the log action without eliminating or overriding the log action itself. Additionally, if no actions are placed at actions 502, and the placeholders 416 of FIG. 4 are left blank by the user, the template resource and/or any template-based workflow that inherits from the template resource may still inherit the log action. Additionally, if unlocked by a developer via the UI 400 of FIG. 4, other stages such as, but not limited to, stage 506(1)-(N) may be selected such that the user may define other stages of the request flow 508 and/or the response flow 510.

Figure 6:
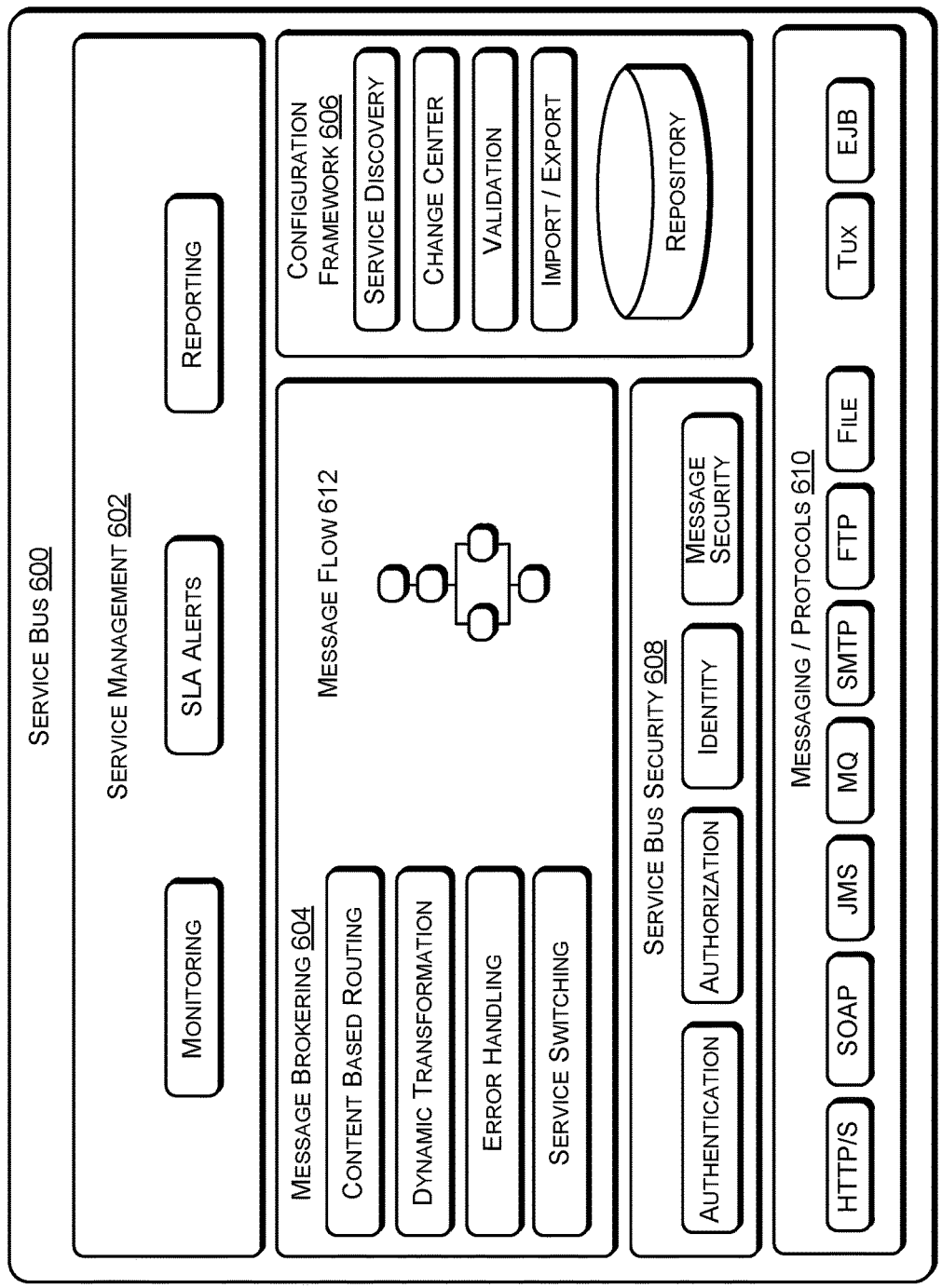
FIG. 6 is a simplified block diagram illustrating at least some features of a service bus for implementing the workflow templates described herein, according to at least a few examples.

FIG. 6 depicts an example service bus 600 for implementing the workflow templates described above. In some examples, the service bus 600 may include a service management module 602, a message brokering module 604, a configuration framework module 606, a service bus security module 608, and/or a messaging/protocols module 610. Additionally, in some examples, the messaging/protocols module 610 may describe which protocols may be supported by the service bus 600. For example, the service bus 600 may support requests received by client applications based at least in part on the hypertext transfer protocol (HTTP), the secure hypertext transfer protocol (HTTPS), the simple object access protocol (SOAP), the java message service (JMS), message queues (MQs), the simple mail transfer protocol (SMTP), the file transfer protocol (FTP), and/or the File scheme. Additionally, the service bus may also be able to manage requests and/or responses written using the transactions for Unix, extended for the distributed operations (Tuxedo) specification and/or the JavaBeans (EJB) specification.

In some aspects, the message brokering module 604 of the service bus 600 may include content-based routing of requests and/or responses, dynamic transformation of requests and/or responses, error handling, service switching, and/or an implementation of message flows 612. The service bus security module may include authentication, authorization, identify management, and/or message security functionality. Additionally, in some examples, the configuration framework module 606 may include a service directory, a change center, validation, imports, exports, and/or a data repository of configuration information. Further, the service management module 602 of the service bus 600 may be configured for monitoring of requests and/or responses, providing service-level agreement (SLA) alerts, and/or reporting information associated with the service bus 600 and/or the message flows 612.

Figure 7:
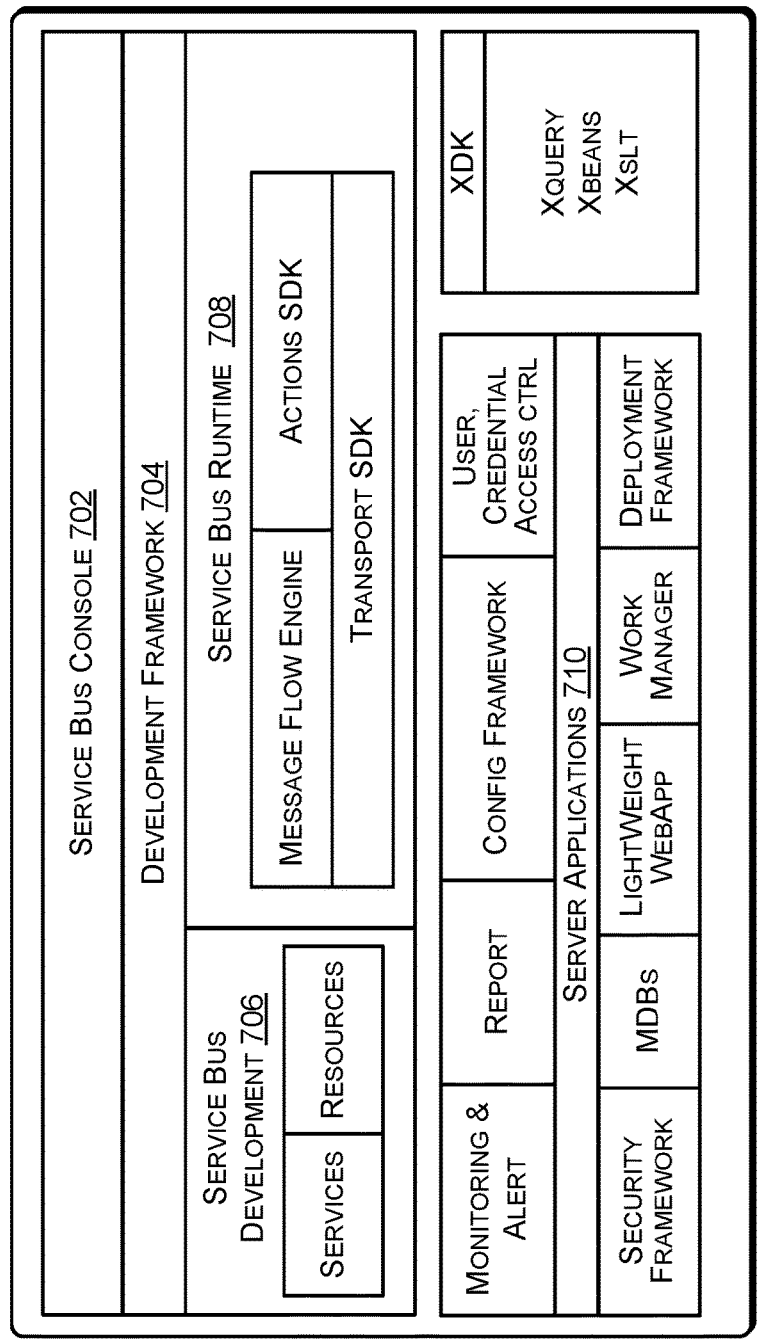
FIG. 7 is a simplified block diagram illustrating at least some additional features of a service bus for implementing the workflow templates described herein, according to at least a few examples.

FIG. 7 depicts an example high level architecture 700 for implementing the workflow templates and/or the service bus 600 described above with reference to at least FIG. 6 (or the service bus 104 of at least FIG. 1). In some examples a service bus console (otherwise described as a UI) 702 may be provided. Additionally, in some examples, the console 702 may be hosted, run, or otherwise implemented within a WebLogic server (or other server-type architecture). For example, the lightweight portal framework 704 may be part of such a server-type architecture (e.g., running within a Java EE environment). Aside from the console 702, the service bus 600 of FIG. 6 may also implement a service bus development module 706 configured to provide services and/or resources for developing or otherwise creating template resources. Additionally, the service bus 600 may also implement a service bus runtime module 708. The service bus runtime module 708 may be configured to implement a message flow engine as well as an actions software development kit (SDK) and/or a transport SDK. Common services that may be shared by both the server applications and the service bus may include monitoring and alerting, reporting, configuration frameworks, user credentials, and/or access controls. Additionally, other server-side applications that may be shared with the service bus 600 may include a security framework, message driven beans (MDBs), lightweight web applications, work managers, and/or deployment frameworks.

Figure 8:
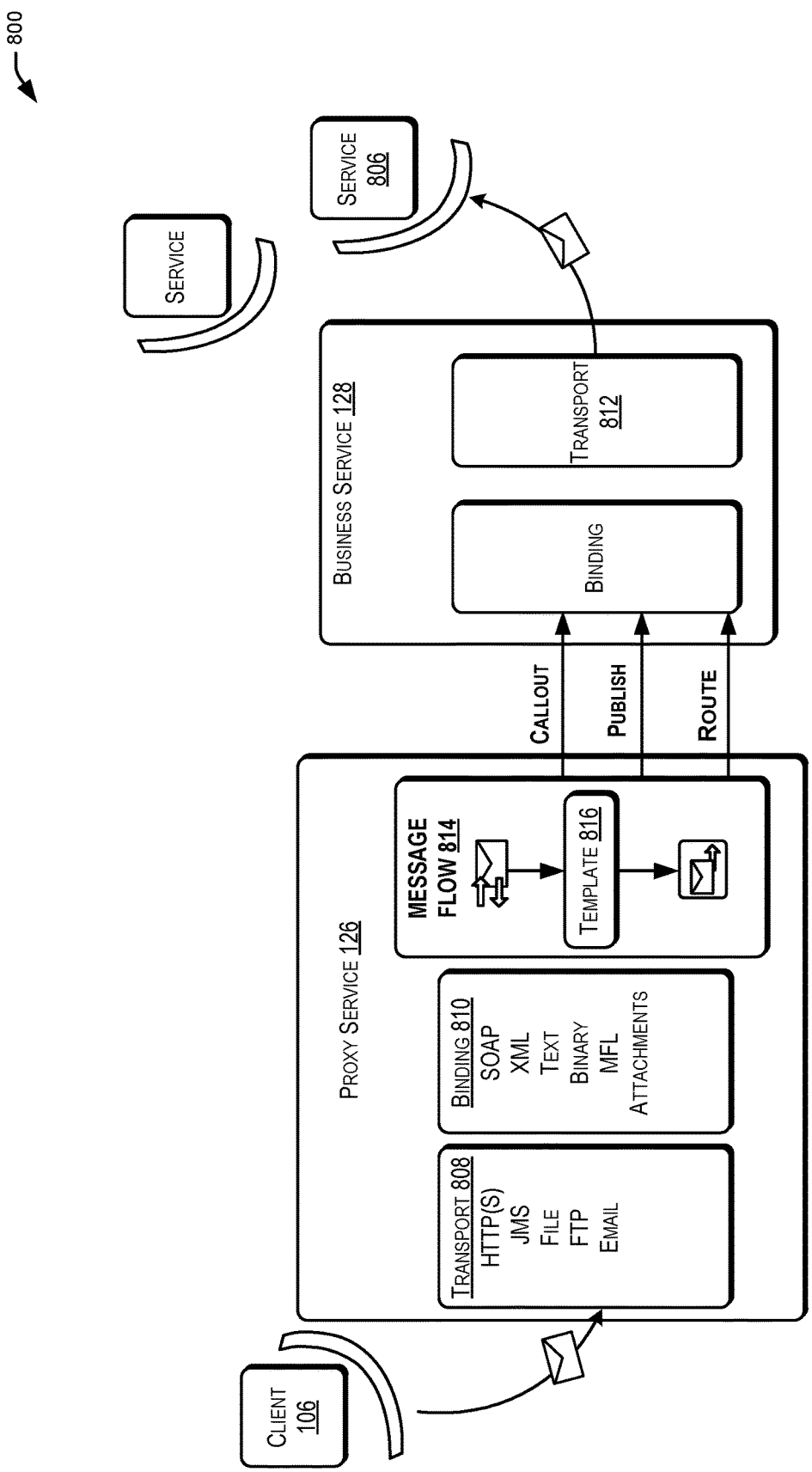
FIG. 8 is a simplified block diagram illustrating at least one message flow process associated with the workflow templates described herein, according to at least a few examples.

FIG. 8 depicts an example service bus message flow 800 for implementing the workflow templates and/or the service buses described above. In some examples, a proxy service 126 (e.g., from FIG. 1) of the service bus may receive requests from clients 106 (e.g., from FIG. 1) and/or provide the requests to services (otherwise referred to as proxy services) 806 via a business service 128 (e.g., from FIG. 1). Requests may be received by the inbound transport module 808 based at least in part on any type of transport protocol such as, but not limited to, HTTP, HTTPS, JMS, File, FTP, and/or email. A binding component 810 may then bind each request to a particular protocol or format for processing (e.g., based at least in part on SOAP, the extensible markup language (XML), text files, binary code, the message format language (MFL), and/or attachments). In some aspects, the message flows may be independent of the transport 808 and/or the binding 810. Additionally, outbound messages from the outbound transport module 812 may be independent from inbound messages received by the inbound transport module 808. Further, a streaming interface may be utilized to process messages between the transport modules 808, 812 and the message flow module 814.

In some examples, the message flow module 814 may process the message utilizing a workflow engine or a pipeline created by one or more developers and/or users associated with the client 106. As noted, the message flow 814 may also include one or more template resources 816. As such, the message flow 814 may perform one or more actions and/or branches, and may also resolve one or more conditions. Additionally, based at least in part on the template resource 816, the message flow 814 may inherit changes or other policies associated with the template resource 816 instantiated therein. Upon processing the message flow 814, the service bus may callout, publish, and/or route information to the business service module 128. The business service module 128 may bind the message to an appropriate protocol and then pass the message to the outbound transport module 812 which may be configured to enable transmission of the message (also referred to as a request) to the service 806.

Figure 9:
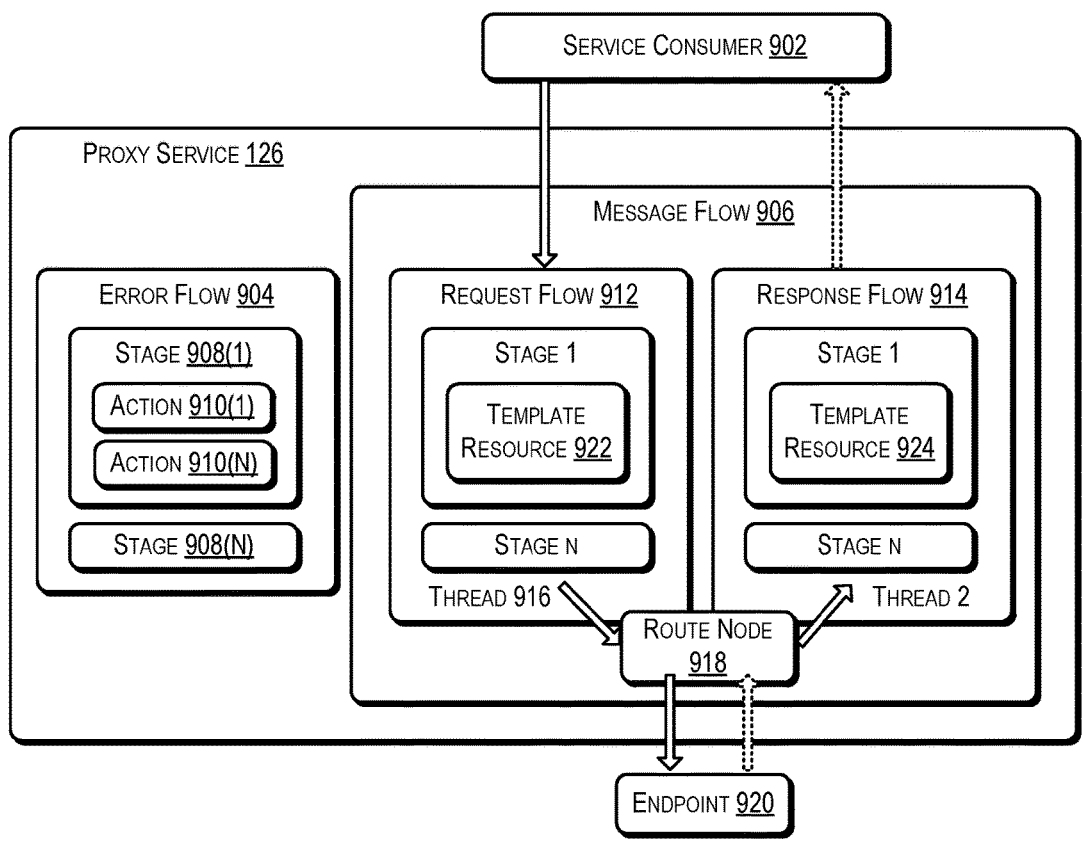
FIG. 9 is a simplified block diagram illustrating at least some features of a proxy service for utilizing the workflow templates described herein, according to at least a few examples.

FIG. 9 depicts another example service bus message flow 900 for implementing the workflow templates and/or the service buses described above. In some examples, a proxy service 126 (e.g., from FIG. 1) of the service bus may receive requests from a service consumer 902. In some examples, the proxy service 126 may include an error flow module 904 and/or a message flow module 906. The error flow module 904 may be configured for error handling when a protocol is not recognized or an action is expecting particular parameters that are not received. Much like message flow 906, the error flow 904 may include one or more stages 908(1)-(N) and/or one or more actions 910(1)-(N). Additionally, the message flow module 906 may include a request flow 912 and a response flow 914. The request flow 912 may be configured to receive and/or process requests received by the service consumer (i.e., a client application). The response flow 914 may be configured to process and/or transmit requests to be sent back to the service consumer. Further, in some examples, the request flow 912 may be configured to instantiate a thread 916 for providing the request to a route node 918, which may, in turn, provide the request to an endpoint 920 (e.g., the business service 128 of FIGS. 1 and 8).

In some aspects, the endpoint 920 may provide a message from the business service 128 or other endpoint to the route node 918. A second thread 922 may be created or utilized to provide this message to the response flow 914. The response flow 914 may be configured to perform one or more actions, similar to the request flow 912, including, but not limited to, log, assign, delete, insert, java callout, transform, translate, rename, replace, validate, alert, report, reply, resume, skip, publish, and/or service callout. The response flow 914 may also transmit the message back to the service consumer 902. Additionally, as noted above, each of the request flow 912 and/or the response flow 914 may exist as a result of having instantiated one of the template resources 922, 924, respectively and/or one or more actions. The template resources 922, 924 may include developer configured actions, user configured actions, and/or may inherit changes made to the template resources 922, 924 without recompiling or otherwise re-instantiating the proxy service 126.

Figure 10:
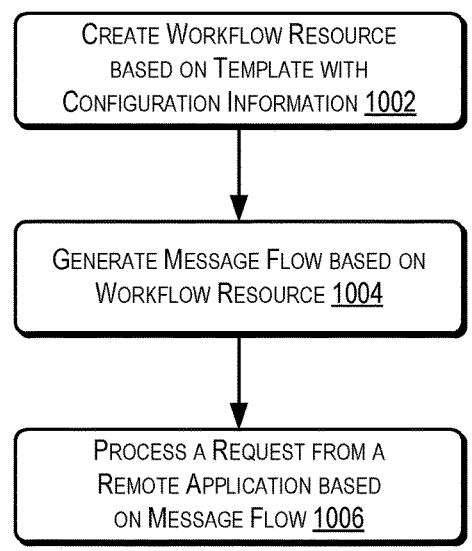
FIG. 10 is a simplified flow diagram illustrating at least some features of one or more methods configured to implement the workflow templates described herein, according to at least a few examples.
Figure 11:
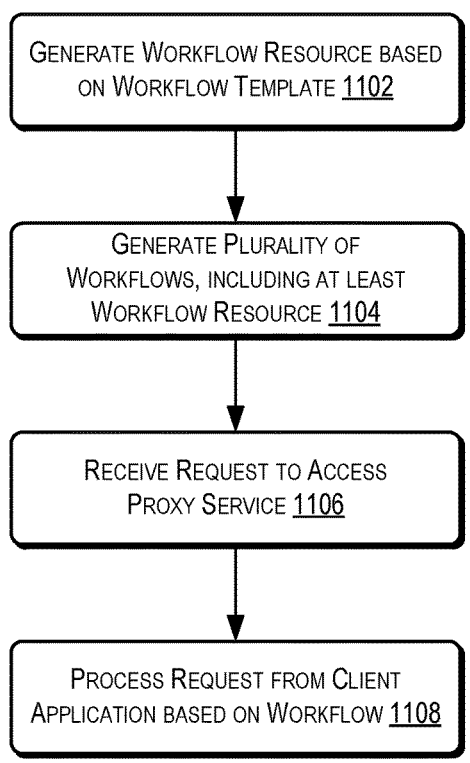
FIG. 11 is a simplified flow diagram illustrating at least some additional features of one or more methods configured to implement the workflow templates described herein, according to at least a few examples.
Figure 12:
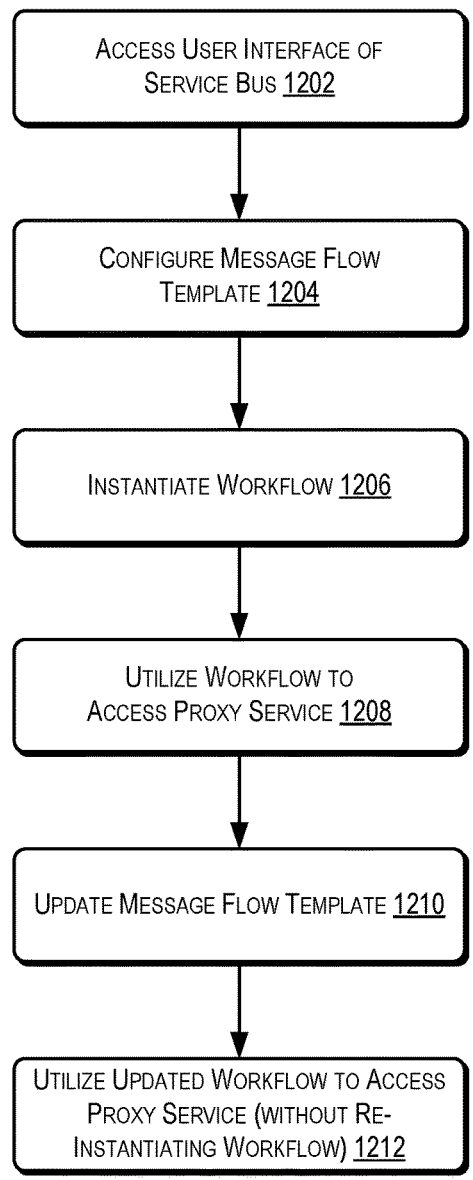
FIG. 12 is a simplified flow diagram illustrating at least some additional features of one or more methods configured to implement the workflow templates described herein, according to at least a few examples.

FIGS. 10-12 illustrate simplified example flow diagrams showing respective processes 1000, 1100, and 1200 for providing workflow templates. These processes are illustrated as logical flow diagrams, each operation of which represents a sequence of operations that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular data types. The order in which the operations are described is not intended to be construed as a limitation, any number of the described operations can be omitted, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some aspects, the process 1000 of FIG. 10 may be performed by at least the service bus module 124 of FIG. 1. The process 1000 may begin at 1002 where the process 1000 may include creating a workflow resource (also referred to herein as a "template-based workflow") based at least in part on a workflow template. In some examples, the workflow template may receive actions, either locked or unlocked, conditional statements, and/or branches. The workflow resource may be designed by a developer or administrator associated with a client application and/or configured by a user associated with the client application. In some examples, the workflow resource may be an object (e.g., a type of programming resource utilized in object-oriented programming) that represents a template configured by the client application (or developers, etc.). This object may inherit later changes made to the template. The process 1000 may also include generating a plurality of message flows at 1004. The plurality of message flows may be generated based at least in part on the workflow resource. In some aspects, each of the plurality of message flows may inherit the template such that changes to the template may automatically update each of the generated message flows. Additionally, the message flows may be referred to as pipelines and/or workflows and may comprise a regular non-template-based message flow merged with a workflow resource or template resource.

The process 1000 may include receiving a request to access a proxy service. The proxy service may be any type of proxy service that a client application may wish to access. The request to access the proxy service may include a request from a client application and/or a request for data stored with or otherwise managed by the proxy service. The process 1000 may end at 1006, where the process 1000 may include processing the request from the remote application based at least in part on the message flow. That is, the message flow that was generated using the workflow resource (i.e., based at least in part on template configured by the client application) may process the resource request from the client application. This processing may follow or at least be constrained by the configuration and/or policies of the template and may be updated in real-time whenever changes are made to the template.

FIG. 11 illustrates a simplified example flow diagram showing the process 1100 for providing workflow templates. In some aspects, the process 1100 of FIG. 11 may be performed by at least the service bus module 124 of FIG. 1. The process 1100 may include providing a user interface configured to enable a client application to configure a workflow template. The user interface may be a graphical user interface and may provide a visual representation of a pipeline or other workflow engine. Actions, conditions, stages, and/or branches may be added by an administrator, developer, or other user associated with the client application. In some aspects, configuring the workflow template may include providing locked actions that cannot be changed and/or providing placeholders for other developers or other users to add actions as desired. At 1102, the process 1100 may begin by including generation of a workflow resource based at least in part on the workflow template. As discussed, the workflow resource may be made up of a workflow object (or other instructions for processing a workflow) merged with the workflow template.

In some examples, the process 1100 may include generating a plurality of workflows at 1104. Workflows may define workflow engine tasks or processes to be performed for the client applications. Each workflow may be associated with a particular type of request to be made by the client application and/or may be associated with a particular proxy service to be accessed. In some cases, the workflows may inherit from the workflow resources and/or workflow templates such that changes made to the workflow template may update the workflow in real-time. At 1106, the process 1100 may also include receiving a request to access a proxy service. Further, the process 1100 may end at 1108, where the process 1100 may include processing the request from the client application based at least in part on the workflow. In this way, a client application may continue to make requests for proxy services to a mediator or translator operating the workflow (e.g., the service bus of FIG. 1) without updating each workflow when changes are requested. That is, changes to a template, made by the client application, may automatically and in real-time update each of the plurality of workflows that inherit from the template being updated.

FIG. 12 illustrates a simplified example flow diagram showing the process 1200 for configuring and/or utilizing workflow templates by a user. In some aspects, the process 1200 of FIG. 12 may be performed by at least the service bus module 124 of FIG. 1 and/or utilizing at least the UI 300 of FIG. 3. The process 1200 may begin at 1202, where the process 1200 may include the user accessing a user interface of a service bus application. The service bus application may be configured as part of a workflow engine or mediator for translating or otherwise transforming requests from one protocol to another and/or from one client application to a proxy service independent of the protocols used by each. At 1204, the process 1200 may include the user configuring a message flow template. As noted, configuring the message flow template may include designing the message flow template for others to configure (e.g., inserting placeholders, locked actions, and/or unlocked actions) and/or configuring an already designed message flow template (e.g., configuring actions and/or inserting actions into placeholders).

In some examples, the process 1200 may also include instantiating a workflow at 1206. Instantiating a workflow may be done via a UI or other application configured to enable a user to create or launch a workflow. At 1208, the process 1200 may include utilizing the workflow to access one or more proxy services. Additionally, in some examples, the user may wish to make changes to the template. As such, at 1210, the process 1200 may include a user updating the message flow template. By updating the message flow template, the user may effectively update each instantiated workflow that includes the message flow template and/or inherits from the message flow template. Further, the process 1200 may end at 1212, where the process 1200 may include the user utilizing the workflow to access the proxy services (e.g., similar to at 1208). However, at 1212, the user may utilize the workflow without re-instantiating the workflow service. In other words, the changes to the workflow template may have automatically updated the workflow such that the workflow does not need to be redeployed, re-instantiated, re-configured, or otherwise changed at all.

Figure 13:
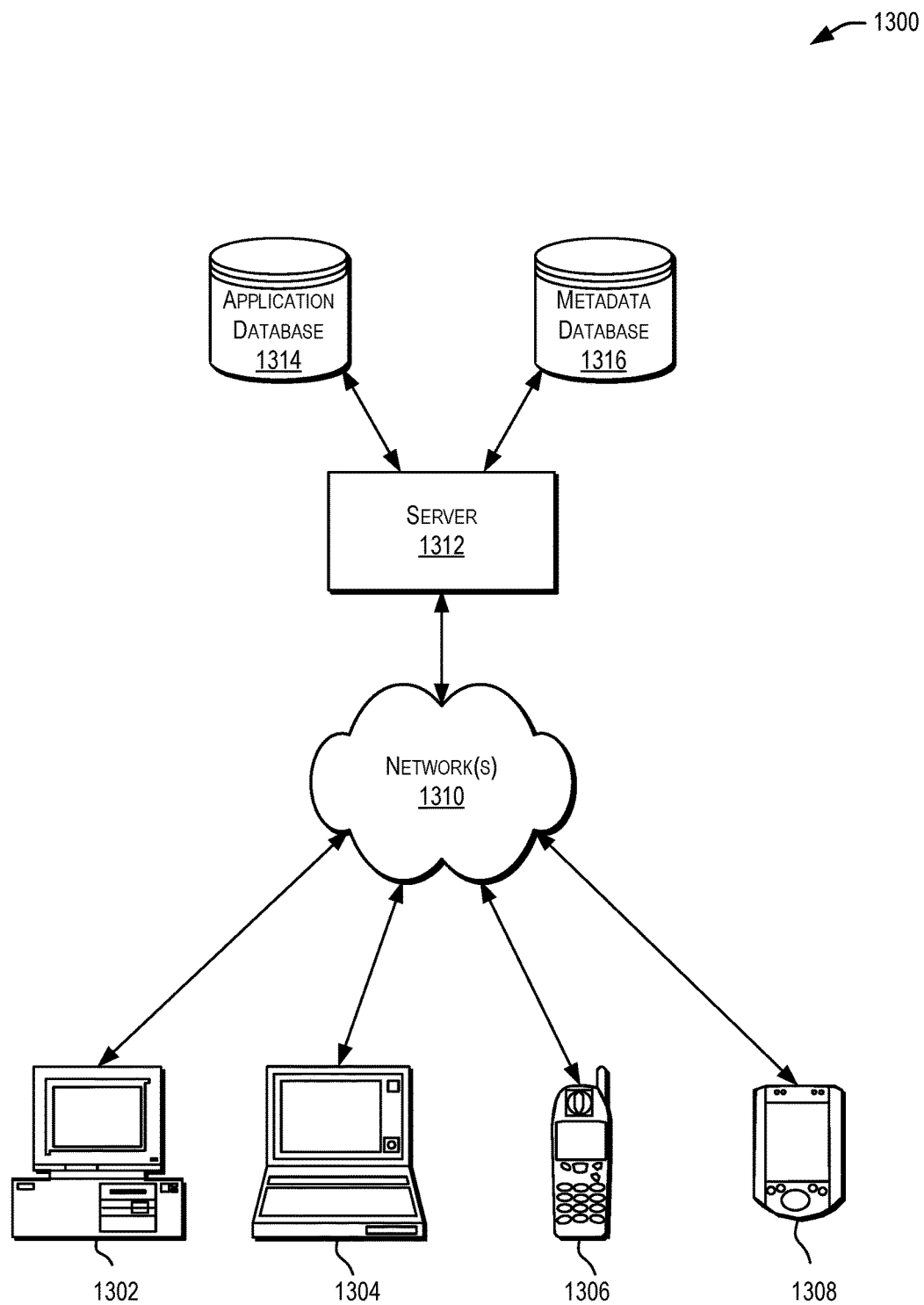
FIG. 13 is a simplified block diagram illustrating components of a system environment that may be used in accordance with an embodiment of the workflow templates described herein, according to at least one example.

FIG. 13 is a simplified block diagram illustrating components of a system environment 1300 that may be used in accordance with an embodiment of the present disclosure. As shown, system environment 1300 includes one or more client computing devices 1302, 1304, 1306, 1308, which are configured to operate a client application such as a web browser, proprietary client (e.g., Oracle Forms), or the like. In various embodiments, client computing devices 1302, 1304, 1306, and 1308 may interact with a server 1312.

Client computing devices 1302, 1304, 1306, 1308 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1302, 1304, 1306, and 1308 may be any other electronic device, such as a thin-client computer, Internet-enabled gaming system, and/or personal messaging device, capable of communicating over a network (e.g., network 1310 described below). Although exemplary system environment 1300 is shown with four client computing devices, any number of client computing devices may be supported. Other devices such as devices with sensors, etc. may interact with server 1312.

System environment 1300 may include a network 1310. Network 1310 may be any type of network familiar to those skilled in the art that can support data communications using any of a variety of commercially-available protocols, including without limitation TCP/IP, SNA, IPX, AppleTalk, and the like. Merely by way of example, network 1310 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1300 also includes one or more server computers 1312 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1300 may also include one or more databases 1314, 1316. Databases 1314, 1316 may reside in a variety of locations. By way of example, one or more of databases 1314, 1316 may reside on a non-transitory storage medium local to (and/or resident in) server 1312. Alternatively, databases 1314, 1316 may be remote from server 1312, and in communication with server 1312 via a network-based or dedicated connection. In one set of embodiments, databases 1314, 1316 may reside in a storage-area network (SAN) familiar to those skilled in the art. Similarly, any necessary files for performing the functions attributed to server 1312 may be stored locally on server 1312 and/or remotely, as appropriate. In one set of embodiments, databases 1314, 1316 may include relational databases, such as databases provided by Oracle, that are adapted to store, update, and retrieve data in response to SQL-formatted commands.

Figure 14:
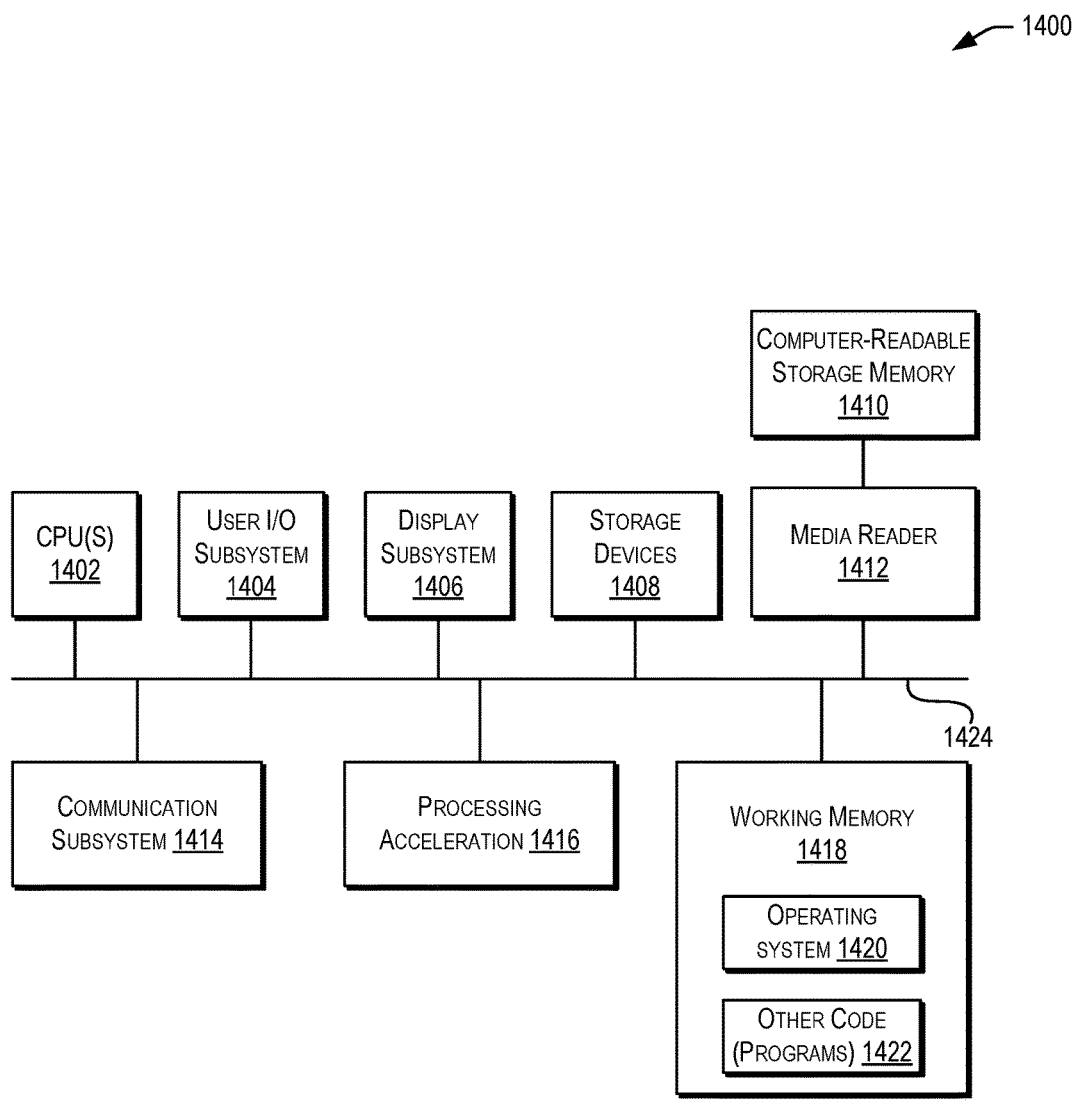
FIG. 14 is a simplified block diagram illustrating a computer system that may be used in accordance with embodiments of the workflow templates described herein, according to at least one example.

FIG. 14 is a simplified block diagram of a computer system 1400 that may be used in accordance with embodiments of the present disclosure. For example the computing systems 102 of FIG. 1 may be implemented using a system such as system 1400. Computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). Computer system 1400 may also include one or more storage devices 1408. By way of example, the storage device(s) 1408 may include devices such as disk drives, optical storage devices, and solid-state storage devices such as a random access memory (RAM) and/or a read-only memory (ROM), which can be programmable, flash-updateable and/or the like.

Computer system 1400 may additionally include a computer-readable storage media reader 1412, a communications subsystem 1414 (e.g., a modem, a network card (wireless or wired), an infra-red communication device, etc.), and working memory 1418, which may include RAM and ROM devices as described above. In some embodiments, computer system 1400 may also include a processing acceleration unit 1416, which can include a digital signal processor (DSP), a special-purpose processor, and/or the like.

Computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing computer-readable information. Communications system 1414 may permit data to be exchanged with network 1412 and/or any other computer described above with respect to system environment 1400.

Computer system 1400 may also comprise software elements, shown as being currently located within working memory 1418, including an operating system 1420 and/or other code 1422, such as an application program (which may be a client application, Web browser, mid-tier application, RDBMS, etc.). In an exemplary embodiment, working memory 1418 may include executable code and associated data structures used by a relying party and open authorization-related processing as described above. It should be appreciated that alternative embodiments of computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile (non-transitory), removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing the features described herein are described above. Some or all of these systems and methods may, but need not, be implemented at least partially by architectures such as those shown in FIGS. 1-13 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a memory storing a plurality of instructions; and
one or more processors configured to access the memory, wherein the one or more processors are further configured to execute the plurality of instructions to:
create, by a service bus application, a template-based workflow that comprises an action, the template-based workflow created based at least in part on a workflow template, and the workflow template associated with configuration information;
identify a placeholder in the workflow template and a location of the placeholder;
enable configuration of additional actions for the template-based workflow at the location, the additional actions comprising customizable actions;
receive, from a client application, a custom action;
generate, by the service bus application, a message flow for use within the service bus application based at least in part on the configuration information and the custom action; and
process, by the service bus application, a request to access a proxy service in communication with the service bus application based at least in part on the message flow.

2. The system of claim 1, wherein the one or more processors are further configured to execute the plurality of instructions to provide a graphical user interface associated with the workflow template configured to enable input of the configuration information.

3. The system of claim 1, wherein the configuration information identifies at least one parameter associated with a third-party application.

4. The system of claim 3, wherein the request is received from the third-party application.

5. The system of claim 3, wherein the service bus application is configured to mediate between the third-party application and the proxy service.

6. The system of claim 5, wherein the proxy service comprises a web service.

7. The system of claim 1, wherein the one or more processors are further configured to execute the plurality of instructions to:

receive updated configuration information via the workflow template;
update the template-based workflow based at least in part on the updated configuration information; and
automatically update the message flow based at least in part on the updated template-based workflow.

8. A non-transitory computer-readable memory storing a plurality of instructions executable by one or more computer systems, the plurality of instructions comprising:
instructions that cause the one or more computer systems to instruct the service bus application to generate a template-based workflow that comprises an action, the template-based workflow generated based at least in part on a workflow template, and the template associated with configuration information;
instructions that cause the one or more computer systems to identify a placeholder in the template and a location of the placeholder;
instructions that cause the one or more computer systems to enable configuration of additional actions for the template-based workflow at the location, the additional actions comprising customizable actions;
instructions that cause the one or more computer systems to receive, from a client application, a custom action;
instructions that cause the one or more computer systems to instruct the service bus application to generate a plurality of workflows for use within the service bus application based at least in part on the configuration information and the custom action, at least one of the plurality of workflows including at least the template-based workflow; and
instructions that cause the one or more computer systems to instruct the service bus application to process a request to access a web service based at least in part on the at least one of the plurality of workflows.

9. The non-transitory computer-readable memory of claim 8, wherein the workflow template includes at least configuration information associated with a remote application.

10. The non-transitory computer-readable memory of claim 8, wherein the at least one of the plurality of workflows that includes the template-based workflow is configured to inherit a change made to the template-based workflow.

11. The non-transitory computer-readable memory of claim 10, wherein the change is made to the template-based workflow based at least in part on an update, by a remote application, of the workflow template.

12. The non-transitory computer-readable memory of claim 8, wherein the plurality of workflows are configured to at least translate the request to access the web service into a request configured for transmission to the web service.

13. The non-transitory computer-readable memory of claim 8, wherein the plurality of instructions further comprise:

instructions that cause the one or more computer systems to receive, from a remote application, a change to the template; and
instructions that cause the one or more computer systems to update, in real-time, at least one of the template-based workflow or the message flow based at least in part on the change.

14. A computer-implemented method, comprising:
providing, by a computer system, a user interface configured to enable a client application to configure a workflow template, the workflow template configured to include at least configuration information associated with the client application;
generating, by the computer system, a template-based workflow that comprises an action, the template-based workflow created based at least in part on the workflow template, and the template associated with configuration information;
identifying, by the computer system, a placeholder in the template and a location of the placeholder;
enabling, by the computer system, configuration of additional actions for the template-based workflow at the location, the additional actions comprising customizable actions;
receiving, from a client application, a custom action;
generating, by the computer system, a plurality of workflows for use within the service bus application based at least in part on the configuration information and the custom action, each of the plurality of workflows including at least the template-based workflow; and
processing, by the computer system, a request to access a proxy service from a client application based at least in part on at least one of the plurality of workflows.

15. The computer-implemented method of claim 14, further comprising providing a user interface comprising at least a graphical user interface component configured to enable entrance of the configuration information associated with the client application.

16. The computer-implemented method of claim 15, wherein the graphical user interface component is further configured to enable the client application to update the workflow template with at least second configuration information.

17. The computer-implemented method of claim 16, wherein each of the plurality of workflows is modified based at least in part on a change to the template-based workflow, the change to the template-based workflow based at least in part on the updated workflow template.

18. The computer-implemented method of claim 17, wherein each of the plurality of workflows is modified in real time with reference to the updated workflow template.

19. The computer-implemented method of claim 14, wherein the plurality of workflows are configured to perform the custom action based at least in part on the template-based workflow.

* * * * *